United States Patent Office 2,758,918
Patented Aug. 14, 1956

2,758,918

PLANT REGULATORS

Samuel B. Soloway and Juan G. Morales, Denver, Colo., and Johannes Van Overbeek, Modesto, Calif., assignors to Shell Development Company, New York, N. Y., a corporation of Delaware No Drawing. Application March 14, 1955,
Serial No. 494,279

19 Claims. (Cl. 71—2.6)

This invention pertains to novel compositions useful as plant regulators and to their use for regulating, modifying, or controlling the growth processes of living plant tissue. More particularly, the present invention pertains to novel compositions, useful for agricultural purposes, comprising a new chemical type of plant regulator as an active component, and to the method for regulating the growth processes of living plant tissues by application of the novel compositions to the plants or plant tissue.

It is well known that certain chemical compounds have the capacity to induce elongation of the shoot cells of growing plants, as well as to affect other growth processes of the living plant. Illustrative auxins, as these chemical compounds are generally known, include the naturally occurring auxin indole-3-acetic acid and also such well-known synthetic plant regulators as 2,4-dichlorophenoxyacetic acid (2,4-D), 2,5-dichlorobenzoic acid (2,5-B), alphanaphthaleneacetic acid (NAA), 2,4,5-trichlorophenoxyacetic acid (2,4,5-T), and others.

In accordance with the present invention there has been discovered a new chemical type of plant regulator. Surprisingly, the new regulators of this invention generally exert an action on plants that is distinctly different from the effects of the foregoing and similar known plant regulators. Instead of inducing cellular elongation of the shoots of growing plants, the plant regulators of this invention tend to suppress cell elongation. Applied in appropriate amounts to the foliage of living plants, the new growth regulators of this invention tend to induce defoliation of the plant, rather than to inhibit it as do the auxin-like plant regulators, notably 2,4-D and NAA. Whereas the auxin-like plant regulators when applied in suitable concentrations tend to promote root development, as, for example, on cuttings, the new regulators of this invention when similarly applied tend to suppress the development or growth of roots. In general, the novel regulators of this invention tend to produce effects opposite to those induced by indoleacetic acid, naphthaleneacetic acid, and other auxin-like plant regulators which in general promote growth, and, therefore, the new plant regulators of this invention exert what may be termed an anti-auxin effect.

The new chemical type of plant regulator that is provided by the invention comprises certain substituted aliphatic carboxylic acids and the anhydro derivative of these acids. These substituted acids, and the anhydro derivatives thereof, all are characterized by the substitution, on the aliphatic acid residue, of a bicyclic, unsaturated, cycloaliphatic, fused-ring nucleus comprising two fused pentatomic carbocyclic rings having three carbons in common. According to a preferred aspect of the invention the bicyclic fused-ring nucleus is substituted by one or more atoms of halogen, preferably a plurality of atoms of chlorine and/or bromine. Although the bicyclic fused-ring nucleus may contain one or more hydrocarbon substituents containing preferably a relatively low number of carbon atoms, in the preferred active agents of the invention the nuclear halogens are present as the only substituents on the carbon atoms which form the bicyclic fused-ring nucleus.

Experiments have demonstrated that, as is true with 2,4-dichlorophenoxyacetic acid, naphthaleneacetic acid, and other known growth promoters, anhydro derivatives of the above-defined class of substituted acids exert physiological effects upon plants, although in all cases not in a manner fully equivalent to the substituted acids per se.

The anhydro derivatives are, generally speaking, the derivatives of the acids which can be regarded as being derived from the carboxylic acid by anhydrosynthesis, or by coupling of the carboxyl group (which may be regarded as being in the hydrated form—$C(OH)_3$) with an organic compound containing hydroxyl attached to carbon or with a base, with consequent elimination of water. Anhydro derivatives which have been employed in novel compositions of the invention for regulating the growth of living plants or plant tissues include salts of inorganic bases, such as alkali metal and alkaline earth metal salts, salts of amphoteric metals, ammonium salts and hydrazine salts; salts of organic bases, such as amines; esters, including esters of simple monohydric alcohols as well as those of polyhydric alcohols, of substituted aliphatic alcohols and also of phenols; amides, both N-substituted and N-unsubstituted; and imido derivatives, such as imido-ethers or imidates, and imido-amides, or amidines.

Although physiological activity with respect to plants and plant tissues thus broadly characterizes the novel plant regulators of this invention, it has been found that the esters, the salts, and especially the acids per se generally are the most effective of the novel regulators, especially when applied to mature plants. In the preferred compositions of the invention the active agent is present in the ionizable form represented by the substituted carboxylic acid per se or a salt of the acid, for example, an alkali metal or nitrogen-base salt.

The following examples will serve to illustrate the invention in one or more of its novel aspects as it pertains to novel plant regulators, to novel compositions containing the same and suitable for use for agricultural or horticultural purposes, and to the regulation, modification, control, prevention, or eradication of plant growth by application to the living plant or plant tissue or its environment.

In one series of tests, the physiological activity of the novel plant regulators of the invention was illustrated with respect to defoliation of peach trees. In these tests, branches of mature Elberta peach trees field-grown in the San Joaquin Valley of California, were sprayed with measured concentrations of the materials to be tested. Emulsions were prepared by mixing a xylene or acetone solution of the material to be tested with diesel oil and emulsifying one volume of the concentrate in eight volumes of water with the aid of an oil-soluble emulsifying agent (0.2% B 1956, a low molecular weight glycerolphthalic ester emulsifying agent sold by Rohm and Haas Company, and 0.2% Triton X-100, an alkylphenolethylene oxide reaction product sold by Rohm and Haas Company), or by similarly emulsifying in water a solution of the test material in petroleum distillate having a distillation range of about 480° F. to about 740° F., an aromatics content of about 38% and a viscosity of about 43 seconds S. S. U. at 100° F. For each test, three branches were sprayed; the extent of defoliation was measured by leaf count three days after the spray application. The following table represents the results that were observed.

TABLE I

| Ex. No. | Active agent | Concentration of active agent in spray, gms. per liter | Percent defoliation |
|---|---|---|---|
| 1 | 1,4,5,6,7,7-hexachlorobicyclo(2.2.1)-5-heptene-2-acetic acid. | 0.36 | 100 |
| 2 | 1,4,5,6,7,7-hexachlorobicyclo(2.2.1)-5-heptene-2-carboxylic acid, M. P. 176-8° C. | 3.5 | 100 |
| 3 | do | 1.75 | 80 |
| 4 | 1,4,5,6-tetrachlorobicyclo(2.2.1)-5-heptene-2-carboxylic acid. | 1.4 | 20 |
| 5 | 1,4,5,6,7,7-hexachlorobicyclo(2.2.1)-5-heptene-2-acrylic acid. | 1.9 | 100 |
| 6 | 1,4,5,6,7,7-hexachlorobicyclo(2.2.1)-5-heptene-2-propionic acid. | 1.9 | 86 |
| 7 | 1,4,5,6,7,7-hexachlorobicyclo(2.2.1)-5-heptene-2-pelargonic acid. | 2.3 | 80 |
| 8 | 1,4,5,6-tetrachlorobicyclo(2.2.1)-5-heptene-2-carboxylic acid, M. P. 138-40° C. | 1.4 | 20 |
| 9 | Bicyclo(2.2.1)-5-heptene 2-carboxylic acid. | 0.14 | 40 |
| 10 | Ethyl 1,4,5,6,7,7-hexachlorobicyclo(2.2.1)-5-heptene-2-acetimidate hydrochloride. | 2.1 | 85 |
| 11 | Ethyl 1,4,5,6,7,7-hexachlorobicyclo(2.2.1)-5-heptene-2-acetimidate hydrobromide. | 2.3 | 90 |
| 12 | Isopropyl 1,4,5,6,7,7-hexachlorobicyclo(2.2.1)-5-heptene-2-acetimidate hydrochloride. | 2.2 | 55 |
| 13 | Methyl 1,4,5,6,7,7-hexachlorobicyclo(2.2.1)-5-heptene-2-acetimidate hydrochloride. | 2.0 | 85 |
| 14 | Ethyl 1,4,5,6,7,7-hexachlorobicyclo(2.2.1)-5-heptene-2-carboximidate hydrochloride. | 2.3 | 40 |
| 15 | Ethyl alpha-cyano-1,4,5,6,7,7-hexachlorobicyclo(2.2.1)-5-heptene-2-acrylate. | 0.42 | 95 |
| 16 | Ethyl alpha-cyano-1,4,5,6-tetrachlorobicyclo(2.2.1)-5-heptene-2-acrylate. | 0.25 | 100 |
| 17 | Ethyl alpha-cyanobicyclo(2.2.1)-5-heptene-2-acrylate. | 2.2 | 20 |
| 18 | Ethyl 1,4,5,6,7,7-hexachlorobicyclo(2.2.1)-5-heptene-2-acetate. | 1.9 | 80 |
| 19 | Sodium 1,4,5,6,7,7-hexachlorobicyclo(2.2.1)-5-heptene-2-carboxylate. | 2 | 25 |
| 20 | Sodium 1,4,5,6,7,7-hexachlorobicyclo(2.2.1)-5-heptene-2-acetate. | 0.005 | ᵃ 100 |
| 21 | Sodium bicyclo(2.2.1)-5-heptene-2-acetate. | 0.1 | ᵃ 70 |
| 22 | Control test | | 0 |

ᵃ Tests carried out by immersing cut end of peach branch in aqueous solution at indicated concentration.

In a second series of tests, the effects of plant regulators of the invention upon the germination of seeds was determined. The tests were carried out under standardized conditions in the greenhouse. Seeds of the tests species of plant were planted in sterilized loamy field soil in 3 inch porous clay pots. After planting, the soil in each pot was sprayed with an aqueous dispersion prepared by emulsifying or dispersing the active agent in water at concentrations of 500 and 50 mg. per 100 cc. of the dispersion, using a water-soluble emulsifying agent (Santomerse, an aromatic sulfonate emulsifying agent produced by Monsanto Chemical Company) to aid in effecting dispersion of the active agent. Twenty cubic centimeters of the dispersion was sprayed uniformly on the surface of the soil in each pot. The effects of the treatment were judged by observation of the condition of seedlings, if any, that germinated. In the following table, killing or severe stunting at the lower of the two concentrations is indicated by the numeral 1, killing or severe stunting only at the higher of the two test concentrations is indicated by the numeral 2, and only mild toxicity at the test concentrations is indicated by the numeral 3. A dash (—) indicates no test was made.

TABLE II

| Ex. No. | Active agent | Oats (Avena sativa) | Radish (Raphanus sativus) | Cotton (variety Acala 4-42) |
|---|---|---|---|---|
| 23 | 1,4,5,6,7,7-hexachlorobicyclo(2.2.1)-5-heptene-2-acrylic acid. | 2 | 1 | --- |
| 24 | 1,4,5,6-tetrachlorobicyclo(2.2.1)-5-heptene-2-acrylic acid. | 3 | 3 | --- |
| 25 | 1,4,5,6,7,7-hexachlorobicyclo(2.2.1)-5-heptene-2-acetic acid. | 2 | 2 | --- |
| 26 | 1,4,5,6,7,7-hexachlorobicyclo(2.2.1)-5-heptene-2-carboxylic acid, M. P. 176-8° C. | 1 | 2 | --- |
| 27 | Bicyclo(2.2.1)-5-heptene-2-acetic acid. | 3 | 3 | --- |
| 28 | 1,4,5,6,7,7-hexachlorobicyclo(2.2.1)-5-heptene-2-propionic acid. | 2 | --- | 2 |
| 29 | 1,4,5,6,7,7-hexachlorobicyclo(2.2.1)-5-heptene-2-carboxylic acid, crude. | 1 | --- | 1 |
| 30 | 1,4,5,6,7,7-hexachlorobicyclo(2.2.1)-5-heptene-2-acrylic acid, M. P. 120.5-121° C. | 1 | --- | 2 |
| 31 | 1,4,5,6,7,7-alpha,beta-octachlorobicyclo(2.2.1)-5-heptene-2-propionic acid. | 2 | --- | 3 |
| 32 | 1,4,5,6-tetrachlorobicyclo(2.2.1)-5-heptene-2-carboxylic acid, M. P. 138-40° C. | --- | --- | 2 |
| 33 | 1,4,5,6,7,7-hexachloro-3-methylbicyclo(2.2.1)-5-heptene-2-carboxylic acid. | 3 | --- | 2 |
| 34 | 1,4,5,6,7,7-hexachlorobicyclo(2.2.1)-5-heptene-2-carboxylic acid anhydride. | 2 | --- | 2 |
| 35 | Methyl 1,4,5,6-tetrachlorobicyclo(2.2.1)-5-heptene-2-carboxylate, M.P. 86.5-87° C. | 2 | 1 | --- |
| 36 | Methyl 1,4,5,6-tetrachlorobicyclo(2.2.1)-5-heptene-2-carboxylate, M.P. 62-63° C. | 2 | 1 | --- |
| 37 | Butyl 1,4,5,6,7,7-hexachlorobicyclo(2.2.1)-5-heptene-2-carboxylate. | 3 | --- | 3 |
| 38 | 2-acetamidoethyl 1,4,5,6,7,7-hexachlorobicyclo(2.2.1)-5-heptene-2-carboxylate. | 3 | --- | 3 |
| 39 | 2-diethylaminoethyl 1,4,5,6,7,7-hexachlorobicyclo-(2.2.1)-5-heptene-2-carboxylate. | 3 | --- | 3 |
| 40 | 1,4,5,6,7,7-hexachlorobicyclo(2.2.1)-5-heptene-2-acrylonitrile. | 2 | 2 | --- |
| 41 | (1,4,5,6,7,7-hexachlorobicyclo(2.2.1)-5-hepten-2-yl methylene) malononitrile. | 3 | --- | 2 |
| 42 | Ammonium 1,4,5,6,7,7-hexachlorobicyclo(2.2.1)-5-heptene-2-carboxylate. | 2 | --- | 2 |
| 43 | Potassium 1,4,5,6,7,7-hexachlorobicyclo(2.2.1)-5-heptene-2-carboxylate. | 2 | --- | 2 |
| 44 | Zinc 1,4,5,6,7,7-hexachlorobicyclo(2.2.1)-5-heptene-2-carboxylate. | 2 | --- | 2 |
| 45 | N-(2-hydroxyethyl)ammonium 1,4,5,6,7,7-hexachlorobicyclo(2.2.1)-5-heptene-2-carboxylate. | 2 | --- | 2 |
| 46 | Hydrazinium 1,4,5,6,7,7-hexachlorobicyclo(2.2.1)-5-heptene-2-carboxylate. | 3 | --- | 2 |

*Example 47.*—In a third series of experiments, the antagonism between the action of 1,4,5,6,7,7-hexachlorobicyclo(2.2.1)-5-heptene-2-acetic acid and known auxin-like materials was determined by observation of the effects of the test materials on the growth of isolated pea stem sections. In each test, five sections, about 0.5 cm. in length, cut from the stems of pea seedlings, *Pisium jativum* ("Alaska" variety), were immersed in a buffer solution containing the material to be tested for about 18 hours at ambient temperature.

The growth was determined by visual measurement of the length of the sections before and after the 18 hour period. The following results were obtained:

TABLE III

| Experiment No. | Test solution | Percent increase in length |
|---|---|---|
| 1 | Buffer solution ᵃ | 37 |
| 2 | Buffer solution+5 parts per million of 1,4,5,6,7,7-hexachlorobicyclo(2.2.1)-5-heptene-2-acetic acid. | 15 |
| 3 | Buffer solution+0.05 parts per million of 2,4-dichlorophenoxyacetic acid. | 65 |
| 4 | Buffer solution+1 part per million of 2,5-dichlorobenzoic acid. | 46 |
| 5 | Buffer solution+5 parts per million of 1,4,5,6,7,7-hexachlorobicyclo(2.2.1)-5-heptene-2-acetic acid and 0.05 parts per million of 2,4-dichlorophenoxyacetic acid. | 18 |
| 6 | Buffer solution+5 parts per million of 1,4,5,6,7,7-hexachlorobicyclo(2.2.1)-5-heptene-2-acetic acid and 1 part per million of 2,5-dichlorobenzoic acid. | 17 |

ᵃ Control. Represents native growth of the pea sections. Composition of buffer: 0.01 M solution of $KH_2PO_4$ and $Na_2HPO_4$, pH 5.7, in water containing 1% of sucrose.

From a comparison of experiments 1 and 2, it is seen that 1,4,5,6,7,7 - hexachlorobicyclo(2.2.1) - 5-heptene-2-acetic acid present at a concentration of 5 p. p. m. reduced the growth of the pea sections by about 60%. In contrast, 2,4-dichlorophenoxyacetic acid and 2,5-dichlorobenzoic acid are seen from experiments 3 and 4 compared with experiment 1 to have increased the growth by about 75% and about 24%, respectively. In addition to the different action thus evidenced by experiments 1 to 4, experiments 5 and 6 show that 1,4,5,6,7,7-hexachlorobicyclo(2.2.1)-5-heptene-2-acetic acid completely abolished the growth stimulation induced by 2,4-dichlorophenoxyacetic acid and 2,5-dichlorobenzoic acid, evidencing the antagonistic action between this plant regulator of the present invention and these known auxin-like materials.

*Example 48.*—In a fourth group of experiments, the action of 1,4,5,6,7,7-hexachlorobicyclo(2.2.1)-5-heptene-2-acetamidine hydrochloride upon the living tissue of *Elodea densa* was determined. The experiments were carried out by immersing isolated leaves of the test plant in distilled water containing the test material. After standing immersed in the test solution for about 6 hours in diffused light and then about 12 hours in the dark, in both cases at ambient temperatures, the individual cells of the leaf were examined through an oil-immersion microscope, about 1000x magnification. By observation of the cellular structure and protoplasmic movements the effect of the test material upon the living cells was determined. With 1,4,5,6,7,7-hexachlorobicyclo(2.2.1)-5-heptene-2-acetamidine hydrochloride, toxicity evidenced by disintegration of the intracellular structures and complete cessation of protoplasmic streaming was observed at a concentration of 10 parts per million, demonstrating the high toxicity of this material towards this living plant tissue.

As further examples of the invention, a number of tests were carried out wherein selected plant regulators of the invention were applied to various species of plants and the action on the plant observed. The tests were carried out by preparing solutions or suspensions of the test material in a suitable horticultural carrier and spraying measured amounts of the solution or suspension onto the aerial parts of the plant, with observation of the condition of the plant at an appropriate interval after the spray application. Illustrative examples of the invention as thus carried out are shown in Table IV. In each case control experiments were performed utilizing the same spray composition less the listed active component. In all cases, no adverse effects were observed in the control experiments; the results shown in the table thus are attributable to the presence of the active component shown in the table.

TABLE IV

| Ex. No. | Active component — Chemical name | Concentration, percent w. | Carrier, or formulation of spray | Test plant | Results |
|---|---|---|---|---|---|
| 49 | 1,4,5,6,7,7-hexachlorobicyclo-(2.2.1)-5-heptene-2-carboxylic acid, M. P. 176–178° C. | 2 | Xylene, 10 volumes, diesel oil, 10 volumes, active component and emulsifier a (ca. 1%) emulsified in water to make 100 parts by volume. | Mature field-grown cotton (Acala 4–42), San Joaquin Valley, California. | Induced defoliation. Some foliage burn. |
| 50 | 1,4,5,6,7,7-hexachlorobicyclo-(2.2.1)-5-heptene-2-acetic acid | 8 | ----do---- | Paradox walnut, year-old nursery stock. | Induced defoliation. |
| 51 | ----do---- | 2 | ----do---- | Mature field-grown cotton (Acala 4–42), San Joaquin Valley, California. | Induced defoliation, with high percentage of green leaves abscised. |
| 52 | ----do---- | 1 | ----do---- | Mature field-grown ramie (*Boehmeria nivea*), San Joaquin Valley, California. | Induced defoliation. |
| 53 | ----do---- | 8 | ----do---- | Plum trees, year-old nursery stock. | Induced autumn coloration accompanied by leaf drop. |
| 54 | ----do---- | 2–8 | ----do---- | Black walnut trees, prune trees, peach trees, almond trees. All year-old nursery stock. | Induced defoliation, with some damage to branches at the higher concentrations. |
| 55 | 1,4,5,6,7,7-hexachloro-3-methyl-bicyclo(2.2.1)-5-heptene-2-carboxylic acid. | 4 | 10% diesel oil, active component and emulsifier a (ca. 1%) emulsified in water to make 100 parts by volume. | Bermuda grass, field grown. | Killed off aerial parts of the grass. |
| 56 | 1,4,5,6,7,7-hexachlorobicyclo-(2.2.1)-2,5-heptadienylmethyl-malonic acid. | 0.5 | Acetone solution of active agent dispersed in water with aid of water-soluble emulsifier.b | Oats, greenhouse grown. | Selectively toxic to oats sprayed together with cotton seedlings. |
| 57 | Ammonium 1,4,5,6,7,7-hexachloro-bicyclo(2.2.1)-5-heptene-2-acetate. | 0.2 | Water containing 0.1% Aerosol OT as wetting agent. | Mature field-grown cotton (Acala 4–42), San Joaquin Valley, California. | Induced defoliation. |
| 58 | 1,4,5,6,7,7-hexachlorobicyclo-(2.2.1)-5-heptene-2-carboxamide. |  | Acetone solution of active agent dispersed in water with aid of water-soluble emulsifier.b | Oats, greenhouse grown. | Selectively toxic to oats sprayed together with cotton seedlings. |
| 59 | N-bromo-1,4,5,6,7,7-hexachloro-bicyclo(2.2.1)-5-heptene-2-carboxamide. | 0.12 | ----do---- | ----do---- | Toxic to oats. |
| 60 | Methyl 1,4,5,6,7,7-hexachloro-alpha-hydroxybicyclo(2.2.1)-5-heptene-2-acetate. | 0.25 | ----do---- | Cotton seedlings, greenhouse grown. | Induced defoliation. | a Equal amounts of B1956 and Triton X-100.
b Santomerse.

*Example 61.*—In field tests using one of the plant regulators of the invention as a cotton defoliant, mature cotton (variety Acala 4–42) growing in the San Joaquin Valley of California was treated with 1,4,5,6,7,7-hexachlorobicyclo(2.2.1)-5-heptene-2-acetic acid. Plots of approximately one acre were selected for the tests, with the cotton bearing a heavy opened boll load. In each of the test plots, approximately 75 plants were selected at random and tagged for leaf counts. Leaf counts were made both before spraying and two weeks after spraying. The sprays were applied by helicopter equipped with a commercial spray rig, flying at about 65 miles per hour. The rate of application was varied by means of the rate at which the helicopter traversed the field and by adjustment of the spray apparatus. A concentrate was prepared containing 36% w. of 1,4,5,6,7,7-hexachlorobicyclo(2.2.1)-5-heptene-2-acetic acid, 5% w. of Emcol H-65C (a commercial sulfonate emulsifying agent sold by Emulsol Corporation), 5% w. of the butyl monoether of ethylene glycol, and 54% w. of a light petroleum distillate as solvent. The final spray was made up by diluting the concentrate with sufficient water to give a concentration of 1,4,5,6,7,7-hexachlorobicyclo(2.2.1)-5-heptene-2-acetic acid of 0.5 pound per gallon of emulsion. For comparison, one plot was sprayed with a commercial sodium chlorate-borate defoliant (Ortho Cl) at the dosage rate of 12 gallons per acre recommended by the manufacturer. The results observed are shown in the following table.

TABLE V

| Active material applied | Rate of application | | Initial leaves per plant | Percent defoliation 14 days after spray application |
| --- | --- | --- | --- | --- |
| | Pounds of active material per acre | Gallons of spray per acre | | |
| None | | | | nil |
| 1,4,5,6,7,7-hexachlorobicyclo(2.2.1)-5-heptene-2-acetic acid | 4.3 | 8.5 | 50 | 78 |
| Sodium chlorate-borate | 12 | 12 | 60 | 75 |

The treatment with the 1,4,5,6,7,7-hexachlorobicyclo-(2.2.1)-5-heptene-2-acetic acid caused no visible staining or other injury to the cotton bolls. The cotton plants were uninjured, except for the desired defoliation, and in a condition suitable for harvesting the cotton by mechanical pickers. The fact that young, as well as mature, leaves had been abscised by the treatment with 1,4,5,6,7,7-hexachlorobicyclo(2.2.1)-5-heptene-2-acetic acid was a pronounced advantage in this respect because of the negligible chlorophyll-stain of the cotton during mechanical picking.

The plant regulators that are employed in the novel compositions of this invention comprise broadly the substituted aliphatic carboxylic acids

BCH—R$_n$—COOH and the anhydro derivatives of the same, wherein the symbol BCH represents a bicyclic, unsaturated, fused-ring, carbocyclic, heptatomic ring or nucleus, the symbol R represents a divalent aliphatic radical one valency of which is satisfied by the group BCH and the other valency of which is satisfied by the carboxyl group, and $n$ represents either zero (0) or one (1).

The bicyclic ring represented by BCH may contain but one nuclear unsaturated linkage, or it may contain more than one. In the preferred plant regulators of the invention there is present not more than one nuclear unsaturated linkage in the groupage BCH. The ring system BCH may be subtituted by one or more hydrocarbon groups, such as the phenyl group or a substituted phenyl group, e. g., tolyl or xylyl, or an alkyl group, such as methyl, ethyl, propyl, ispropyl, a butyl group, or the like. It has been found that substitution of halogen on the bicyclic ring represented by BCH greatly and unexpectedly enhances the physiological effects of these new plant regulators upon plants. In the preferred compositions of the invention the active component will contain as the substituent group BCH one exclusively composed or consisting of the elements carbon, hydrogen, and halogen, preferably bromine or chlorine.

As has been made abundantly clear by the examples, the active components of the compositions of this invention may have the carboxyl group represented by —COOH in the foregoing generic formula (or the functional group derived therefrom by anhydrosynthesis) directly substituted on the bicyclic ring system of the group BCH, or the —COOH or functionally related group may be bonded to the ring system through an intervening aliphatic group —R—. The aliphatic group may be saturated or unsaturated, as is shown by the examples, and it may be substituted or unsubstituted. Substituents which may be present on the said aliphatic group include, among others, the cyano group, the carboxyl group, one or more atoms of halogen, e. g., bromine, chlorine, or fluorine, ester groups —O—OC—R and —CO—OR wherein R represents an alkyl, aryl, cycloalkyl, alkenyl, or aralgyl group, the hydroxy group, ether groups —OR wherein R represents an alkyl, aryl, cycloalkyl, alkenyl, or aralkyl groups, etc. Other things being equal, the number of atoms directly intervening between the group BCH and the carboxyl or functionally related group influences to a considerable extent the phytophysiological activity. Although useful compositions of the invention may contain active components wherein as many as eight atoms directly intervene between the carboxy or functionally related group and the group BCH, the most valuable compositions are those wherein there are not more than three intervening atoms. Outstandingly effective as defoliants for cotton, for such orchard crops as peaches, plums, prunes, walnuts, and the like, as well as various nursery stock, are the regulators of the invention wherein $n$ in the foregoing formula represents either 0 or 1 and R represents a methylene or ethylene group or an oxy-substituted methylene or ethylene group. For cotton defoliation, the most effective regulators of the invention appear to be those wherein R represents a methylene group, that is to say, the acetic acid derivatives included by the foregoing formula.

It generally is preferred to employ as the active component of the compositions of the invention either the acid per se, represented by the foregoing formula, or an ionizable anhydro derivative thereof, such as an alkali metal or alkaline earth metal salt. When applied to the foliage of mature plants, which in almost all cases will comprise an outer layer or waxy cuticle that is more or less impervious to penetration by low molecular weight solutes from aqueous solutions, these highly polar materials appear to penetrate into the leaf tissues more readily than do the less polar derivatives, with the result that their hormonal action is more effectively exerted. Where ease of penetration is not a factor, owing to immaturity of the plant or to the species of plant, the relatively non-polar as well as the polar derivatives may be employed quite effectively.

A preferred group of the plant regulators of this invention may be defined as having structures represented by the formula

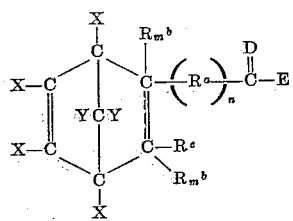

wherein each X represents an atom of halogen, preferably bromine or chlorine and most desirably chlorine, Y represents the hydrogen atom or an atom of halogen, preferably bromine or chlorine and most desirably chlorine, $R^a$ represents an alkylene group of from 1 to 3 carbon atoms, a hydroxy-substituted alkylene group of from 1 to 3 carbon atoms, or a halogen-substituted alkylene group of from 1 to 3 carbon atoms, each $R^b$ and $R^c$ represents the hydrogen atom or an alkyl group of from 1 to 4 carbon atoms, D represents an oxygen atom or NH, E represents hydroxy, alkoxy, aminoalkoxy, metalloxy, aryloxy, and amino (including N-substituted amino) groups. Of these, the preferred active agents will contain but one double bond in the bicyclic ring structure ($m$ represents the numeral 1). With respect to defoliation of cotton, the most active materials of this preferred group appear to be those wherein X and Y each represent chlorine and the bicyclic ring structure is otherwise unsubstituted, R$^a$ represents methylene, ethylene, oxy-substituted methylene, or oxy-substituted ethylene, and the carboxyl group is present either as such or in the form of a derived polar anhydro group, especially alkali metal salt. Of these, 1,4,5,6,7,7-hexachlorobicyclo(2.2.1)-5-heptene-2-acetic acid and its alkali metal salts, such as the sodium salt, appear to be outstanding. The alkyl esters of this acid having from 1 to 2 carbon atoms in the alkyl group are also highly effective for cotton defoliation.

Generally speaking, the active agents that are employed in the agricultural and horticultural compositions of the invention can be prepared by reacting a conjugated cyclopentadiene hydrocarbon or halogen-substituted conjugated cyclopentadiene hydrocarbon with an ethylenically or acetylenically unsaturated aliphatic carboxylic acid or anhydro derivative of such acid in the Diels-Alder manner to produce a 1:1 adduct. In many cases, the desired product may be prepared directly by reaction of the appropriate cyclopentadiene hydrocarbon or halogen-substituted cyclopentadiene hydrocarbon. In other cases it may be more convenient first to prepare a Diels-Alder 1:1 adduct of the cyclopentadiene hydrocarbon or halogen-substituted cyclopentadiene hydrocarbon and the unsaturated acid or anhydro derivative thereof, and then to convert this adduct by modification of the carboxyl or related functional group to obtain the desired product. Methods applicable to the preparation of active components of the compositions of this invention are illustrated by the following examples.

*Example I.—1,4,5,6,7,7-hexachlorobicyclo-(2.2.1)-5-heptene-2-acetic acid*

Vinyl acetic acid and hexachloro-1,3-cyclopentadiene reacted in the Diels-Alder manner and the product distilled and triturated with pentane to purify. Melting point, 119–123° C. 1,4,5,6,7,7-hexachlorobicyclo(2.2.1)-5-heptene-2-acetic acid can also be prepared by acid hydrolysis of 1,4,5,6,7,7-hexachlorobicyclo(2.2.1)-5-heptene-2-acetonitrile prepared in the Diels-Alder manner from hexachloro-1,3-cyclopentadiene and allyl cyanide.

*Example II.—1,4,5,6,7,7-hexachlorobicyclo(2.2.1)-5-heptene-2-carboxylic acid*

Acrylic acid and hexachloro-1,3-cyclopentadiene reacted in the Diels-Alder manner at 120° C. in the presence of glacial acetic acid as diluent and product crystallized from diethyl ether-hexane mixture. Melting point after recrystallization, 181–182.5° C. The same product is obtained by saponification of methyl-1,4,5,6,7,7-hexachlorobicyclo(2.2.1)-5-heptene-2-carboxylate obtained by reaction between methyl acrylate and hexachloro-1,3-cyclopentadiene in the Diels-Alder manner, melting point of product 176–178° C.

*Example III.—1,4,5,6,7,7-hexachlorobicyclo(2.2.1)-5-heptene-2-pelargonic acid*

Hexachloro-1,3-cyclopentadiene and 10-undecenoic acid reacted in the Diels-Alder manner and the product distilled (molecular still). Boiling point, 186–188° C. under $8 \times 10^{-4}$ mm. mercury pressure. Refractive index ($n23/D$) 1.5266.

*Example IV.—1,4,5,6-tetrachlorobicyclo(2.2.1)-5-heptene-2-carboxylic acid*

1,2,3,4-tetrachloro-1,3-cyclopentadiene and acrylic acid reacted and the product fractionally crystallized utilizing successively hexane, hexane-ether, carbon tetrachloride, and nitromethane to yield two fractions, one melting at 157–158° C. and the other melting at 138–140° C. The two fractions represent different stereoisomers having the same planar structure.

*Example V.—1,4,5,6,7,7-hexachlorobicyclo(2.2.1)-5-heptene-2-acrylic acid*

1,4,5,6,7,7-hexachlorobicyclo(2.2.1) - 5 - heptene-2-carboxaldehyde, melting point about 145–148° C., prepared by reaction of hexachloro-1,3-cyclopentadiene and acrolein in the Diels-Alder manner and the product reacted with malonic acid according to the Doebner modification of the Knoevenagel condensation. Melting point 120.5–121.5° C.

*Example VI.—1,4,5,6-tetrachlorobicyclo(2.2.1)-5-heptene-2-acrylic acid*

Prepared in the manner described for 1,4,5,6,7,7-hexachlorobicyclo(2.2.1)-5-heptene-2-acrylic acid substituting 1,2,3,4-tetrachloro-1,3-cyclopentadiene for the hexachloro-1,3-cyclopentadiene. Melting point 120–122° C.

*Example VII.—1,4,5,6,7,7-hexachlorobicyclo(2.2.1)-5-heptene-2-propionic acid*

1,4,5,6,7,7-hexachlorobicyclo(2.2.1)-5-heptene-2-acrylic acid hydrogenated at about 45° C. and 40–50 p. s. i. hydrogen pressure, using platinum oxide catalyst. Melting point 84–84.5° C.

*Example VIII.—Bicyclo(2.2.1)-5-heptene-2-acetic acid*

Allyl cyanide and 1,3-cyclopentadiene reacted in the Diels-Alder manner to produce bicyclo(2.2.1)-5-heptene-2-acetonitrile and this product hydrolyzed to the acid. Boiling point 133–136° C. under 12 mm. mercury pressure.

*Example IX.—1,4,5,6,7,7-hexachloro-3-methylbicyclo-(2.2.1)-5-heptene-2-carboxylic acid*

Hexachloro-1,3-cyclopentadiene and crotonic acid reacted in the Diels-Alder manner and the product crystallized from ethyl acetate. Melting point 171–172° C.

*Example X.—1,4,5,6,7,7-alpha,beta-octachlorobicyclo-(2.2.1)-5-heptene-2-propionic acid*

1,4,5,6,7,7-hexachlorobicyclo(2.2.1)-5-heptene-2-acrylic acid chlorinated in carbon tetrachloride solution by reaction with chlorine gas. Melting point 192–194° C.

*Example XI.—Bicyclo(2.2.1)-5-heptene-2-carboxylic acid*

Cyclopentadiene and acrylic acid reacted in the Diels-Alder manner. Boiling point 89–94° C. under 0.7–0.8 mm. mercury pressure.

*Example XII.—1,4,5,6,7,7-hexachlorobicyclo(2.2.1)-2,5-heptadienylmethyl malonic acid*

Hexachloro-1,3-cyclopentadiene and diethyl propargylmalonate reacted in the Diels-Alder manner to produce diethyl 1,4,5,6,7,7 - hexachlorobicyclo(2.2.1)-2,5-heptadienylmethyl malonate and the ester saponified with ethanolic hydroxide. Product purified by extraction with aqueous caustic, springing, and crystallization from ether-hexane. Melting point 163–165° C.

*Example XIII.—Sodium 1,4,5,6,7,7-hexachlorobicyclo-(2.2.1)-5-heptene-2-acetate*

1,4,5,6,7,7-hexachlorobicyclo(2.2.1)-5-heptene-2-acetic acid dissolved in the equivalent amount of 2.5% w. aqueous sodium hydroxide solution and product crystallized by chilling.

*Example XIV.—Sodium bicyclo(2.2.1)-5-heptene-2-acetate*

Bicyclo(2.2.1)-5-heptene-2-acetic acid neutralized by reaction with the equivalent amount of aqueous sodium hydroxide solution.

*Example XV.—Sodium 1,4,5,6,7,7 - hexachlorobicyclo-(2.2.1)-5-heptene-2-carboxylate*

1,4,5,6,7,7-hexachlorobicyclo(2.2.1) - 5 - heptene - 2-carboxylic acid dissolved in the calculated amount of 2.5% w. aqueous sodium hydroxide solution and the product crystallized by chilling. Solubility of sodium 1,4,5,6,7,7 - hexachlorobicyclo(2.2.1) - 5 - heptene - 2-carboxylate in water at 17° C., ca. 111 grams per liter.

*Example XVI.—Ammonium 1,4,5,6,7,7-hexachlorobicyclo(2.2.1)-5-heptene-2-carboxylate*

Solid 1,4,5,6,7,7-hexachlorobicyclo(2.2.1)-5-heptene-2-carboxylic acid triturated on the steam bath with 1,N-aqueous NH4OH. The salt was insoluble in benzene, hexane and ether; moderately soluble in water and acetone.

*Example XVII.—Potassium 1,4,5,6,7,7-hexachlorobicyclo-(2.2.1)-5-heptene-2-carboxylate*

1,4,5,6,7,7-hexachlorobicyclo(2.2.1) - 5 - heptene - 2-carboxylic acid dissolved in a calculated amount of 7% w. aqueous KOH solution and the product crystallized by evaporation and cooling.

*Example XVIII.—Zinc 1,4,5,6,7,7 - hexachlorobicyclo-(2.2.1)-5-heptene-2-carboxylate*

Zinc chloride added to an equeous solution of sodium 1,4,5,6,7,7 - hexachlorobicyclo(2.2.1) - 5 - heptene - 2-carboxylate to precipitate the insoluble zinc salt.

*Example XIX.—N-(2-hydroxyethyl)ammonium-1,4,5,6,-7,7-hexachlorobicyclo(2.2.1)-5-heptene-2-carboxylate*

Ethanolamine and 1,4,5,6,7,7 - hexachlorobicyclo-(2.2.1)-5-heptene-2-carboxylic acid reacted in equimolar amounts and the product washed with hexane and ether and then dried. Melting point 143–144° C.

*Example XX.—Hydrazinium 1,4,5,6,7,7-hexachlorobicyclo(2.2.1)-5-heptene-2-carboxylate*

1,4,5,6,7,7 - hexachlorobicyclo(2.2.1) - 5 - heptene - 2-carboxylic acid and hydrazine hydrate reacted in equimolar proportions in diisopropyl ether solution. Melting point after recrystallization from methanol-chloroform mixture, 173–176° C.

*Example XXI.—Methyl 1,4,5,6-tetrachlorobicyclo(2.2.1)-5-heptene-2-carboxylate*

1,2,3,4-tetrachloro-1,3-cyclopentadiene and ethyl acrylate reacted in the Diels-Alder manner and the product fractionally crystallized using hexane, methanol and nitromethane as solvents. Two stereoisomeric products obtained, one melting at 62–63° C. and the other melting at 86.5–87° C.

*Example XXII.—Butyl 1,4,5,6,7,7 - hexachlorobicyclo-(2.2.1)-5-heptene-2-carboxylate*

1,4,5,6,7,7 - hexachlorobicyclo(2.2.1) - 5 - heptene - 2-carboxylic acid converted to the acid chloride by reaction with sulfurous oxychloride and the acid chloride reacted with butyl alcohol to yield the ester. Boiling point 126–150° C. under 0.1 mm. mercury pressure.

*Example XXIII.—2 - acetamidoethyl - 1,4,5,6,7,7 - hexachlorobicyclo(2.2.1)-5-heptene-2-carboxylate*

N-acetoethanolamine and the acid chloride of 1,4,5,6,-7,7-hexachlorobicyclo(2.2.1)-5-heptene-2-carboxylic acid reacted in refluxing benzene.

*Example XXIV.—2 - diethylaminoethyl - 1,4,5,6,7,7-hexachlorobicyclo(2.2.1)-5-heptene-2-carboxylate*

2-diethylaminoethanol and the acid chloride of 1,4,5,-6,7,7 - hexachlorobicyclo(2.2.1) - 5 - heptene - 2 - carboxylic acid reacted in pentane solution and product distilled after filtering off the precipitated 2-diethylaminoethanol hydrochloride salt. Boiling point of redistilled product, 160–165° C. under 0.2 mm. mercury pressure.

*Example XXV.—Ethyl 1,4,5,6,7,7 - hexachlorobicyclo-(2.2.1)-5-heptene-2-acetate*

Hexachloride-1,3-cyclopentadiene and allyl cyanide reacted in the Diels-Alder manner to produce 1,4,5,6,7,7-hexachlorobicyclo(2.2.1)-5-heptene-2-acetonitrile and the nitrile reacted with absolute ethanol (sulfuric acid catalyst) to yield the ester. Boiling point 130–133° C. under 0.4 mm. mercury pressure.

*Example XXVI.—1,4,5,6,7,7 - hexachlorobicyclo(2.2.1)-5-heptene-2-acetamidine hydrochloride*

1,4,5,6,7,7 - hexachlorobicyclo(2.2.1) - 5 - heptene - 2-aceto-nitrile in ether solution treated with hydrogen chloride and ethanol and the resulting ethyl 1,4,5,6,7,7-hexachlorobicyclo(2.2.1)-5-heptene-2-acetimidate hydrochloride reacted with ammonia.

*Example XXVII.—Ethyl 1,4,5,6,7,7-hexachlorobicyclo-(2.2.1)-5-heptene-2-acetimidate hydrochloride*

Melting point 140° C. (decomposition).

*Example XXVIII.—Ethyl 1,4,5,6,7,7-hexachlorobicyclo-(2.2.1)-5-heptene-2-acetimidate hydrobromide*

Prepared by reaction of 1,4,5,6,7,7-hexachlorobicyclo-(2.2.1)-5-heptene-2-acetonitrile with ethanol and hydrogen bromide. Melting point 144–145° C. (decomposition).

*Example XXIX.—Isopropyl 1,4,5,6,7,7-hexachlorobicyclo-(2.2.1)-5-heptene-2-acetimidate*

Prepared by reaction of 1,4,5,6,7,7-hexachlorobicyclo-(2.2.1)-5-heptene-2-acetonitrile with isopropyl alcohol and hydrogen chloride. Melting point 150–151° C. (decomposition).

*Example XXX.—Methyl 1,4,5,6,7,7-hexachlorobicyclo-(2.2.1)-5-heptene-2-acetimidate hydrochloride*

Prepared by reaction of 1,4,5,6,7,7-hexachlorobicyclo-(2.2.1)-5-heptene-2-acetonitrile with methanol and hydrogen chloride. Melting point 123–125° C. (decomposition).

*Example XXXI.—Ethyl 1,4,5,6,7,7-hexachlorobicyclo-(2.2.1)-5-heptene-2-carboximidate hydrobromide*

Prepared by reaction of 1,4,5,6,7,7-hexachlorobicyclo-(2.2.1)-5-heptene-2-nitrile with ethanol and hydrogen bromide. Melting point 111° C. (decomposition).

*Example XXXII.—(1,4,5,6,7,7-hexachlorobicyclo(2.2.1)-5-heptene-2-yl-methylene)malononitrile*

Prepared by modified Doebner reaction between malononitrile and 1,4,5,6,7,7-hexachlorobicyclo(2.2.1)-5-heptene-2-carboxaldehyde. Melting point 114–115° C.

*Example XXXIII.—Ethyl alpha-cyanobicyclo(2.2.1)-5-heptene-2-acrylate*

Bicyclo(2.2.1)-5-heptene - 2 - carboxaldehyde reacted with ethyl cyanoacetate.

*Example XXXIV.—Ethyl 1,4,5,6,7,7-hexachloro-alpha-cyanobicyclo(2.2.1)-5-heptene-2-acrylate*

1,4,5,6,7,7 - hexachlorobicyclo(2.2.1) - 5 - heptene-2-carboxaldehyde reacted with ethyl cyanoacetate.

*Example XXXV.—Ethyl 1,4,5,6-tetrachloro-alpha-cyanobicyclo(2.2.1)-5-heptene-2-acrylate*

1,4,5,6-tetrachlorobicyclo(2.2.1)-5-heptene-2 - carboxaldehyde reacted with ethyl cyanoacetate.

*Example XXXVI.—1,4,5,6,7,7-hexachlorobicyclo-(2.2.1)-5-heptene-2-acrylonitrile*

1,4,5,6,7,7 - hexachlorobicyclo(2.2.1) - 5 - heptene-2-carboxaldehyde reacted with cyanoacetic acid by modified Perkin condensation. Melting point 122–122.5° C.

*Example XXXVII.—1,4,5,6,7,7-hexachlorobicyclo-(2.2.1)-5-heptene-2-carboxamide*

Melting point 161–162° C.

*Example XXXVIII.—1,4,5,6,7,7-hexachlorobicyclo-(2.2.1)-5-heptene-2-carboxylic anhydride*

Melting point 190–192° C.

Additional compounds which come into consideration as components of the plant regulator compositions of this invention include the following:

Methyl 1,4,5,6,7,7-hexachlorobicyclo(2.2.1)-5-heptene-2-carboxylate, melting point 57–60° C.

Ethyl 1,4,5,6,7,7 - hexachlorobicyclo(2.2.1) - 2,5 - heptadiene-2-carboxylate, boiling point 116–120° C. under 0.2. mm. mercury pressure Methyl 1,4,5,6,7,7-hexachlorobicyclo(2.2.1) - 2,5 - heptadiene-2-carboxylate, melting point 86.5–87° C.

Methyl 1,4,5,6,7,7-hexachloro - 2 - methylbicyclo(2.2.1)-5-heptene-2-carboxylate, melting point 81–82° C.

Decyl 1,4,5,6,7,7 - hexachlorobicyclo(2.2.1)-5-heptene-2-carboxylate, boiling point 190–195° C. under 0.3 mm. mercury pressure p-Chlorophenyl 1,4,5,6,7,7 - hexachlorobicyclo(2.2.1) - 5-heptene-2-carboxylate, melting point 104.5–106° C.

Methyl 1,4,5,6,7,7-hexachlorobicyclo(2.2.1)-5-heptene-2-acetate, boiling point 118–143° C. under 0.08 mm. mercury pressure Decyl 1,4,5,6,7,7 - hexachlorobicyclo(2.2.1)-5-heptene-2-acetate, boiling point 162° C. under 0.0005 mm. mercury pressure 1,4,5,6,7,7 - hexachlorobicyclo(2.2.1) - 2,5-heptadiene-2-carboxylic acid, melting point 205–210° C. (decomposition)

The novel plant regulator compositions of this invention comprise one or more of the phytophysiologically-active acids or anhydro derivatives thereof dissolved or suspended in or carried by an appropriate horticultural carrier. According to the intended method of application and the species of plant and the type of plant tissue, the novel compositions may be formulated as solutions in water or a suitable organic solvent, as dispersions or emulsions of the active agent in a non-solvent therefor, as emulsions of a solution of the active agent in a suitable solvent emulsified with a second, inhomogeneous liquid, or as solids comprising the active agent or agents sorbed on a sorptive solid carrier.

It has been discovered that where the compositions of the invention are to be applied to mature plants, as for defoliating cotton and other leafy agricultural crops or nursery stock, the composition desirably should contain one or more organic solvents, preferably a hydrocarbon solvent of relatively high aromaticity. In addition to its normal function of serving as solvent for the active agent or agents and also providing a readily applied liquid composition, the relatively aromatic solvent markedly enhances the activity of the agents of the invention, apparently by facilitating penetration of the waxy outer layer of the leaf by the active agent. The aromatic solvent may be a highly refined aromatic hydrocarbon, such as benzene, toluene, xylene, ethyl benzene, cumene or isodurene, or it may be a less highly refined relatively aromatic hydrocarbon mixture, such as a coal tar fraction, a straight-run petroleum distillate, a thermally or catalytically cracked hydrocarbon oil, platformate or the like. Suitable solvents may also comprise a relatively aromatic solvent blended with a substantially aliphatic or naphthenic solvent such as a refined gas oil, light lubricating oil, refined kerosene, mineral seal oil and the like.

Although the solvent usually will be of mineral origin, oils of animal or of vegetable origin may also be employed in or as the carrier. In appropriate cases oxygenated solvents, such as alcohols, e. g., methanol, ethanol, isopropyl alcohol, n-butyl alcohol, and amyl alcohol, ketones, such as acetone, methyl ethyl ketone, methyl isobutyl ketone, etc., glycols and glycol ethers, and chlorinated solvents may be employed as the carrier.

Where a hydrocarbon oil is used as the carrier, it preferably will be one which boils between about 300° F. and about 800° F. and desirably will have a viscosity not over about 60 S. S. U. at 100° F. The relatively aromatic carrier preferably will have an aromatics content upwards from about 20% by volume by sulfonation, although it will be understood that solvents of a lesser degree of aromaticity may be employed. When used for defoliation of cotton, the carrier, of course, should be one which does not lead to undesirable staining of the open cotton bolls.

Solutions of the active agents may be applied as such to the plants or to the soil that is to be treated, as, for example, for herbicidal purposes, or they may be suspended in water and the suspension or emulsion applied to the plants or soil. Thus, a relatively concentrated solution of the active agent in a water-immiscible solvent may be prepared, with added emulsifying, dispersing or other surface active agents, and the concentrate diluted in the spray tank with water to form a uniform fine emulsion which can be applied by conventional spray devices. Emulsions or dispersions of the active agents as such in water may also be prepared and applied.

The invention includes novel solid compositions of matter wherein the active agent or agents are absorbed or adsorbed in or on a sorptive carrier, such as finely divided clay, talc, gypsum, lime, wood flour or the like. The solid composition, or dust, may contain from as little as 1% by weight of active material to 60% by weight or more. It may be prepared in the form of a dust, or as granules designed to be broadcast or to be worked into the soil, as for herbicidal purposes. Wettable powders can be prepared suitable for suspension in water with or without the aid of conventional dispersing or deflocculating agents and with or without such adjuvants as oils, stickers, wetting agents, etc.

Suitable emulsifiable concentrates, adapted for dispersion in water to provide a sprayable composition, ordinarily will contain between about 10% w. and about 50% w. of active agent dissolved in a hydrocarbon or other suitable water-immiscible solvent. Minor amounts, say from about ½% w. to about 10% w. of emulsifying agents may be included to promote dispersion of the concentrate in water. Suitable emulsifying agents are preferably oil soluble and include, among others, alkaryl sulfonates, sulfates of long chain fatty alcohols, amides, such as N-hydroxyalkyl amides of long chain fatty acids, alkylaryl polyoxyethylene glycol ethers, sulfonated white oils, sorbitan esters of long chain fatty acids, alkylamide sulfonates and the like.

Liquid compositions of this invention, suitable for application to plants or their environment, contain the active agent or agents in concentrations generally within the range of from about 0.01% by weight to about 25% by weight. For purposes of defoliation, as, for example, cotton, the preferred compositions of the invention contain 1,4,5,6,7,7 - hexachlorobicyclo(2.2.1) - 5-heptene-2-acetic acid or an alkali metal salt thereof as the active ingredient, at a concentration preferably between about 3% and about 10% by weight of the spray composition. Although not essential to the invention, the effectiveness of such emulsions can be increased significantly by using as the aqueous phase an alkaline aqueous medium. The aqueous phase of the emulsion thus may contain a strong alkali, such as sodium hydroxide, potassium hydroxide, or the like, in concentrations equivalent to from about 0.05 to about 1% w. NaOH, with a pronounced enhancement of activity compared to the emulsions without alkali.

For field application, the rate of application of the active agent may be varied from about 0.5 to 30 or more pounds per acre. For example, an emulsion comprising 0.5 pound of active agent per gallon applied at the rate of 6.5 gallons per acre will give a dosage of 3.2 pounds active agent per acre. For defoliation of cotton, suitable rates of application of the compositions of this invention generally will be within the range of from about 2 to about 8 pounds of active agent per acre, although it will be appreciated that these rates are subject to variation according to the local conditions, for example, temperature, humidity, moisture content of the soil, kind and condition of the plant, etc. For herbicidal purposes, higher rates of application, to as much as 50 pounds or more per acre, may be employed.

Although primarily useful for inducing defoliation of deciduous plants, trees, and shrubs, the compositions of this invention are not restricted in utility to this application. They may be applied during the later reproductive stages of celery, tobacco, lettuce, corn, tomatoes, etc., in order to regulate the flowering. Applied during the earlier stages of development of the plant, they may be used to inhibit terminal growth and stem elongation and to reduce apical dominance. In the growing of orchard crops, such as peaches, pears, prunes, apples, apricots and the like, the compositions of the invention can be used to induce abscission of fruit, whereby increased quality of the remaining yield is obtained. The compositions of the invention also are useful for chemical deflowering. They also may be employed to control or reduce shoot development, as on potatoes and other tuberous vegetables during storage or during storage and shipment of nursery cuttings of ornamental and other plants.

The compositions of this invention may contain one or more of the active agents disclosed herein as the sole active component, or they may contain in addition thereto other biologically active substances. Other plant regulators, such as naphthalene acetic acid, 2,4-dichlorophenoxyacetic acid and the like, as well as insecticides, e. g., DDT, endrin, dieldrin, aldrin, chlordane, systox, methoxychlor, rotenone, and pyrethrum, and fungicides, such as copper compounds, ferbam, captan and the like, may if desired be incorporated in the compositions of the invention.

Reference is hereby made to the copending applications of John F. Wikstrom, Jr., and Juan G. Morales, Jr., entitled "Esters," Serial No. 494,278, Samuel B. Soloway, entitled "Halo-Substituted Bicyclic Aldehydes," Serial No. 494,276, Samuel B. Soloway, entitled "Polyhalogeno Bicyclic Acids," Serial No. 494,277, and Samuel B. Soloway, entitled "Halo-Substituted Bicyclic Compounds," Serial No. 494,280, all filed March 14, 1955, wherein compounds and intermediates useful for purposes of this invention are described and claimed, the pertinent disclosures of said copending applications hereby being incorporated by reference.

It will be appreciated that while specific embodiments of the invention have been presented, numerous other specific embodiments will be apparent to those skilled in the art, and, therefore, that the invention should not be construed as being limited except as appears from the hereto appended claims.

We claim as our invention:

1. A plant regulator composition comprising as an active component in an amount sufficient to effect the growth processes of living plants a chemical compound having a structure represented by the formula

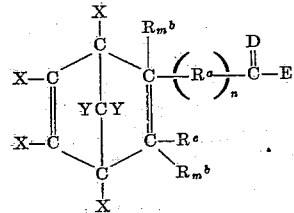

wherein each X represents an atom of halogen, each Y represents one of the group consisting of hydrogen and halogen, $R^a$ represents one of the group consisting of the alkylene groups of from 1 to 3 carbon atoms, the hydroxy-substituted alkylene groups of from 1 to 3 carbon atoms, and the halogen-substituted alkylene groups of from 1 to 3 carbon atoms, each $R^b$ and $R^c$ represents one of the group consisting of hydrogen and alkyl groups of from 1 to 4 carbon atoms, D represents one of the group consisting of O and NH, E represents one of the group consisting of hydroxy, alkoxy, aminoalkoxy, metalloxy, aryloxy, and amino, $n$ represents one of the group consisting of 0 and 1, both $m$'s represent the same member of the group consisting of 0 and 1, and as adjuvant a horticultural carrier therefor.

2. A plant regulator composition comprising as an active component in an amount sufficient to effect the growth processes of living plants an aliphatic carboxylic acid having substituted on the aliphatic acid residue a bicyclic, unsaturated, cycloaliphatic, halogen-substituted, fused-ring nucleus comprising two fused pentatomic carbocyclic rings having three carbons in common, the nuclear carbons being bonded only to members of the group consisting of hydrogen, carbon and halogen, and as adjuvant a horticultural carrier therefor.

3. A plant regulator composition defined by claim 2 comprising as an active component an aliphatic carboxylic acid as defined in claim 2, having a plurality of atoms of halogen substituted on ring carbons of the said bicyclic fused-ring nucleus.

4. A plant regulator composition comprising as an active component in an amount sufficient to affect the growth processes of living plants an anhydro derivative of an aliphatic carboxylic acid having substituted on the aliphatic acid residue a bicyclic, unsaturated, cycloaliphatic, halogen-substituted fused-ring nucleus comprising two fused pentatomic carbocyclic rings having three carbons in common, the nuclear carbons being bonded only to members of the group consisting of hydrogen, carbon and halogen, and as adjuvant a horticultural carrier therefor.

5. A plant regulator composition defined by claim 4 comprising as an active component an anhydro derivative as defined in claim 4 having a plurality of atoms of halogen substituted on ring carbons of the said bicyclic fused-ring nucleus.

6. A plant regulator composition defined by claim 4 wherein the said anhydro derivative is a salt.

7. A plant regulator composition defined by claim 4 wherein the said anhydro derivative is an ester.

8. A plant regulator composition defined by claim 4 wherein the said anhydro derivative is an imido-ether mineral acid salt.

9. A plant regulator composition comprising as an active component in an amount sufficient to effect the growth processes of living plants a 1,4,5,6,7,7-hexachlorobicyclo(2.2.1)-5-heptene-2-alkanoic acid and as adjuvant a horticultural carrier therefor.

10. A plant regulator composition comprising as an active component in an amount sufficient to effect the growth processes of living plants 1,4,5,6,7,7-hexachlorobicyclo(2.2.1)-5-heptene-2-acetic acid and as adjuvant a horticultural carrier therefor.

11. A horticultural composition comprising a solution of 1,4,5,6,7,7 - hexachlorobicyclo(2.2.1) - 5 - heptene-2-alkanoic acid in an aromatic solvent therefor at a concentration sufficient, upon dispersion of the composition in water and application of the dispersion to plants, to affect the growth processes of such plants, and an emulsifying agent adapted to promote dispersion of the solution in water.

12. An emulsion comprising a composition defined by claim 11 dispersed in water.

13. A horticultural composition defined by claim 11 comprising as an active component 1,4,5,6,7,7-hexachlorobicyclo(2.2.1)-5-heptene-2-acetic acid.

14. An emulsion comprising a composition defined by claim 13 dispersed in water.

15. The method of regulating growth processes of plants which comprises bringing into contact with the living plant in an amount sufficient to effect the growth processes of the plant a chemical compound having a structure represented by the formula

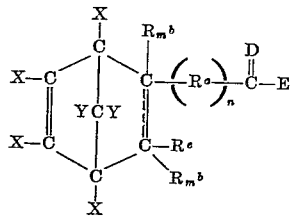

wherein each X represents an atom of halogen, each Y represents one of the group consisting of hydrogen and halogen, $R^a$ represents one of the group consisting of the alkylene groups of from 1 to 3 carbon atoms, the hydroxy-substituted alkylene groups of from 1 to 3 carbon atoms, and the halogen-substituted alkylene groups of from 1 to 3 carbon atoms, each $R^b$ and $R^c$ represents one of the group consisting of hydrogen and alkyl groups of from 1 to 4 carbon atoms, D represents one of the group consisting of O and NH, E represents one of the group consisting of hydroxy, alkoxy, aminoalkoxy, metalloxy, aryloxy, and amino, $n$ represents one of the group consisting of 0 and 1, both $m$'s represent the same member of the group consisting of 0 and 1.

16. The method of regulating growth processes of living plants which comprises bringing into contact with the plant in an amount sufficient to effect the growth processes of the plant an aliphatic carboxylic acid having substituted on the aliphatic acid residue a bicyclic, unsaturated, cycloaliphatic, fused-ring nucleus comprising two fused pentatomic carbocyclic rings having three carbons in common, the nuclear carbons being bonded only to members of the group consisting of hydrogen, carbon and halogen.

17. The method of regulating growth processes of plants which comprises bringing into contact with the plant tissue in an amount sufficient to affect the growth processes of the plant tissue an anhydro derivative of an aliphatic carboxylic acid having substituted on the aliphatic acid residue a bicyclic, unsaturated, cycloaliphatic, fused-ring nucleus comprising two fused pentatomic carbocyclic rings having three carbons in common, the nuclear carbons being bonded only to members of the group consisting of hydrogen, carbon and halogen.

18. In the defoliation of living plants, the method which comprises applying to the foliage thereof a 1,4,5,6,7,7-hexachlorobicyclo(2.2.1)-5-heptene-2-alkanoic acid in an amount sufficient to induce defoliation by the plant.

19. In the chemical defoliation of living cotton plants, the improvement which consists of inducing defoliation by applying to the foliage of the cotton plants an amount of 1,4,5,6,7,7-hexachlorobicyclo(2.2.1)-5-heptene-2-acetic acid sufficient to induce defoliation thereof.

References Cited in the file of this patent

UNITED STATES PATENTS

| | | |
|---|---|---|
| 1,944,731 | Diels et al. | Jan. 23, 1934 |
| 2,688,021 | Jenkins | Aug. 31, 1954 |